United States Patent [19]

Daniels et al.

[11] Patent Number: 4,912,298

[45] Date of Patent: Mar. 27, 1990

[54] METHOD FOR PRODUCING A MARKING ON A SPECTACLE LENS

[75] Inventors: Erwin Daniels; Hermann Schürle, both of Aalen, Fed. Rep. of Germany

[73] Assignee: Carl-Zeiss-Stiftung, Heidenheim, Fed. Rep. of Germany

[21] Appl. No.: 245,329

[22] Filed: Sep. 16, 1988

[30] Foreign Application Priority Data

Sep. 18, 1987 [DE] Fed. Rep. of Germany ....... 3731398

[51] Int. Cl.$^4$ .............................................. B23K 26/00
[52] U.S. Cl. ............................ 219/121.69; 219/121.73
[58] Field of Search ...................... 219/121.68, 121.69, 219/121.67, 121.72, 121.73; 156/643; 351/159, 177; 65/102

[56] References Cited

U.S. PATENT DOCUMENTS

| | | | |
|---|---|---|---|
| 2,746,193 | 5/1956 | Billian | 219/121.68 X |
| 4,219,721 | 8/1980 | Kamen | 219/121.85 |
| 4,414,059 | 11/1983 | Blum et al. | 219/121.85 X |
| 4,478,677 | 10/1984 | Chen | 219/21.69 X |
| 4,490,211 | 12/1984 | Chen et al. | 219/121.69 X |
| 4,535,220 | 8/1985 | Cullis et al. | 219/121.85 |
| 4,619,504 | 10/1986 | Daniels et al. | 351/163 |
| 4,752,668 | 6/1988 | Rosenfield et al. | 219/121.68 |

*Primary Examiner*—C. L. Albritton
*Attorney, Agent, or Firm*—Walter Ottesen

[57] ABSTRACT

A method of producing a marking on a spectacle lens. For producing the marking, those regions on the surface of the spectacle lens which are to define the form of the marking are irradiated with an excimer laser through a mask which contains the marking in the form of a cutout.

20 Claims, 2 Drawing Sheets

METHOD FOR PRODUCING A MARKING ON A SPECTACLE LENS

BACKGROUND OF THE INVENTION

Spectacle lenses are most often provided with an identifying mark from which the manufacturer can be identified. This is especially important in the case of a claim or an objection which is sometimes made after the product has been used for a while. Accordingly, this type of identifying mark must be on the spectacle lens itself in a permanent form. On the other hand, the marking should not disturb the person wearing the spectacles during normal use thereof.

With non-rotational symmetrical spectacle lenses such as toric and bifocal lenses, the spectacle lens has to have a marking which provides the optician with a control so that he may fit the lens into the spectacle frame without difficulty. A marking of this type should likewise not be irritating to a person wearing the spectacles.

It is known to apply a marking to a spectacle lens by means of a very fine mechanical engraving. This method is very expensive and requires substantial effort. It is further known to produce an etched marking by etching away a portion of the glass. However, this method requires that the entire remaining portion of the lens be covered with an enamel coating or the like which must later be removed. Accordingly, this method too requires a substantial expenditure. Markings are also known which are applied to the lens with a stamp in the form of the desired marking. In this method, certain substances are applied to the lens surface which cause the region of the marking to have a degree of wettability different from that of the remaining surface of the lens. This type of marking is made visible for a short time by exhaling onto the lens. The disadvantage of this kind of mark is that it lasts for only a limited time.

All of the method described above have in common that they must be performed with a great deal of care and therefore with relatively large amount of effort so that on the one hand, a good visibility is achieved for the optician while, on the other hand, the person wearing the spectacles will not be disturbed by the marking. These rather contradictory requirements can only be achieved by maintaining tight tolerances.

The tight tolerances of this kind are best controlled and maintained by means of a likewise known method by which a suitable substance is vaporized onto the spectacle lens with the aid of a mask or template. The masks or templates have openings formed therein which correspond to the desired marking so that the substance is applied to the lens only in the form of the marking. With templates which are mounted directly in front of the spectacle lens even with only very limited spacing, there is however the disadvantage that the marking will not be sharply defined at the edges thereof.

U.S. Pat. No. 4,619,504 discloses a spectacle lens having an anti-reflection coating wherein the marking is in the form of at least one region carved into the anti-reflection coating. For this purpose, a removable adhering substance is applied to the spectacle lens in the region to be carved out for the marking. Thereafter, the anti-reflection coating is vaporized onto the entire spectacle lens. At a later time, the removable adhering substance including the anti-reflection coating applied to this substance is wiped away.

This process has the disadvantage that it can only be applied to spectacle lenses having an anti-reflection coating and that the removable adhering substance must be applied with care and with a relatively substantial effort for large numbers of units.

SUMMARY OF THE INVENTION

Accordingly, it is an object of the invention to provide a method for producing a marking on spectacle lenses with o without an anti-reflection coating and to do so with the least possible effort. It is another object of the invention to provide such a method which corresponds to high requirements as to the characteristics of the marking.

The method according to the invention is for producing a marking on a spectacle lens which includes the step of irradiating the regions of the surface of the spectacle lens which are to exhibit the form of the marking with an excimer laser.

Excimer lasers are pulsed gas-discharge lasers. In these lasers, a gas mixture (for example, argon, fluorine) is energetically charged in an electrical discharge and is caused to transmit an intensive laser flash.

It has been shown to be advantageous to drive the excimer laser with a pulse or a plurality o pulses and at a wavelength of approximately 193 nm. With this wavelength, the depth of penetration into normal glasses and plastic is very minimal. For this reason, the laser energy is taken up in a very thin surface layer which is brought to a high temperature. A thin layer of approximately 0.1 $\mu$m is in this way vaporized from the surface. The energy f the pulsed laser lies between 1 J/cm$^2$ and 5 J/cm$^2$ and is dependent upon the lass or plastic used or upon the anti-reflection coating.

It is especially advantageous to irradiate the spectacle lens through a mask which contains the form of the marking as a cutout. Such masks can be mounted on or in front of the spectacle lens with the spacing of the mask from the spectacle lens not being critical because of the parallel radiation of the laser.

It is still more advantageous to image the mask on the surface of the spectacle lens with optical means which passes ultraviolet radiation. If this image is reduced, a high energy density is obtained on the surface of the spectacle lens and therefore a lesser number of pulses or a reduced capacity of the laser is required.

If the spectacle lens has no anti-reflection coating, then by means of the radiation with the excimer laser, only so small a layer is removed from the surface of the spectacle lens that the marking is recognizable as a breath mark.

If the spectacle lens has an anti-reflection coating, a reduced amount of this layer is removed by means of irradiation. In this way, the interference condition is disturbed and the marking is easily recognizable in reflected light while the person wearing the spectacles notices nothing.

A special advantage of the invention is that even anti-reflecting coatings themselves can be provided, for example, with a trademark so that the coatings are protected from imitation. Furthermore, spectacle lenses having anti-reflection coatings can also be provided with trademarks in a larger and decorative form which are also recognizable by the inexperienced eye and nonetheless do not disturb the spectacle wearer. Finally, it is also possible to provide all spectacle lenses with markings independently of whether they are later provided with anti-reflection coatings. For those spectacle lenses which are later provided with an anti-reflecting coating, the breath mark is no longer recognizable. These spectacle lenses can once again be provided with markings in the anti-reflection coating.

BRIEF DESCRIPTION OF THE DRAWINGS

The invention will now be described with reference to the drawing wherein.

DESCRIPTION OF THE PREFERRED EMBODIMENTS OF THE INVENTION

Figure 1:
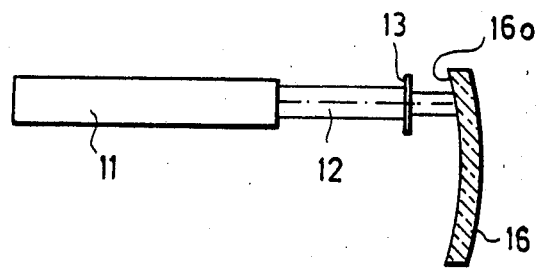
FIG. 1 is a side elevation view of an arrangement wherein the mask is mounted close in front of the spectacle lens.

In FIG. 1, reference numeral 11 designates an excimer laser such as the kind sold by the Lambda Physik Company under the product designation EMG 200. The Lambda Physik Company is located in the Federal Republic of Germany. The bundle of mutually parallel rays leaving this laser impinge on the mask 13 for which further examples are explained below with reference to FIGS. 3 and 4. The largest portion of the radiation of the laser is held back by the mask 13 and only in those regions which correspond to the form of the desired mark is the radiation of the laser allowed to pass through by the mask and impinges upon the surface 16o of the spectacle lens 16 where this radiation effects a small removal in the form of the desired mark.

Figure 2:
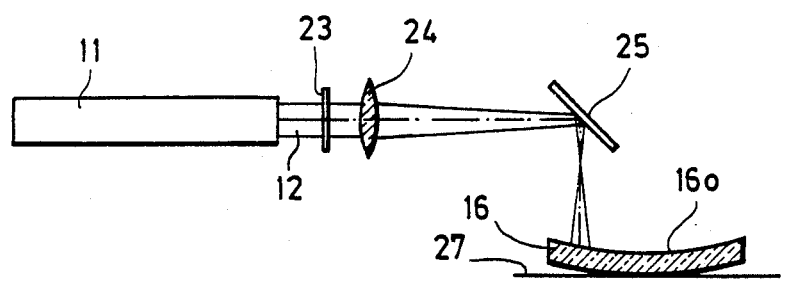
FIG. 2 is an arrangement wherein the mask is imaged on the spectacle lens.

In FIG. 2, the mask 23 is image on the surface 16o of the spectacle lens 16 by the lens 24 via the deflection mirror 25. It is advantageous to image the mask for example at a scale of 1:5 because the energy density on the surface of the spectacle lens 16 will n this way be greater. Even in this case, the depth of field of the image is so great that the supporting surface can remain unchanged even for spectacle lenses having different radii of curvature.

Figure 3A:
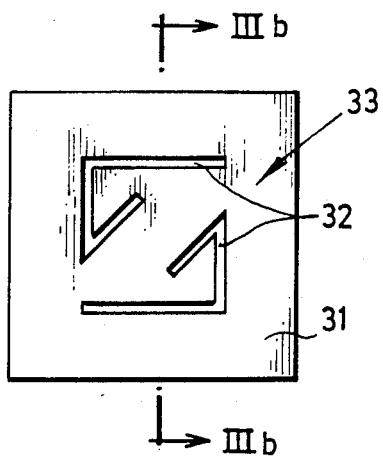
FIG. 3a is a plan view of a mask provided with a trademark.
Figure 3B:
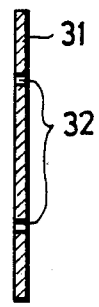
FIG. 3b is a section view taken through the mask of FIG. 3a along line IIIb–IIIb; and, FIG. 4 is a mask having markings.

FIG. 3 shows details f the masks 13 or 23. Cutouts 32 are machined into a plate made of a material 31 such as metal which is impermeable to the radiation of an excimer laser. In FIG. 3, the cutouts 32 define a character 33 which in this case is a highly stylized Z in the form of a trademark.

Figure 4:
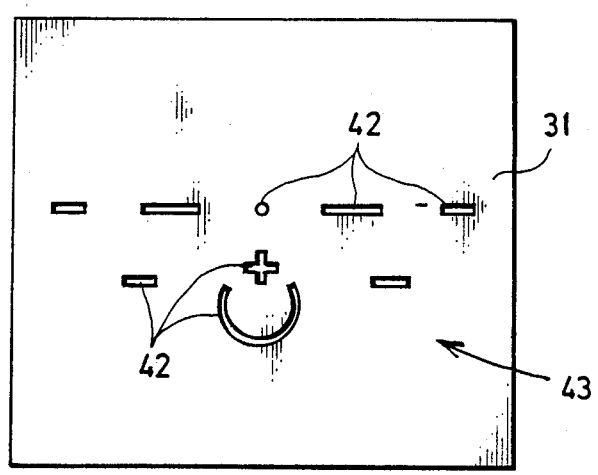

FIG. 4 shows a mask 13 or 23 in which cutouts in the form of geometric FIGS. 42 have been machined as markings into the radiation-impermeable material 31.

It is understood that the foregoing description is that of the preferred embodiments of the invention and that various changes and modifications may be made thereto without departing from the spirit and scope of the invention as defined in the appended claims.

What is claimed is:

1. A method of producing a marking on glass and plastic spectacle lenses, the method comprising: the step of directly irradiating those regions of the surface of the lens which define the form of the marking with an excimer laser so as to permit the radiation of the excimer laser itself to effect a small removal of the material of the lens to define the marking.

2. The method of claim 1, wherein the excimer laser irradiates said regions with a pulse or a plurality of pulses at a wavelength of approximately 193 nm.

3. The method of claim 1, said step of irradiating said regions being preceded by the step of arranging a mask in front of the lens, and then irradiating the lens through said mask with the latter containing cutouts having the form of said marking.

4. The method of claim 3, said mask being spaced away from the surface of said spectacle lens.

5. The method of claim 3, said mask being directly on the surface of the spectacle lens.

6. The method of claim 1, wherein the spectacle lens is irradiated through a mask containing cutouts having the form of the marking and wherein said cutouts are imaged onto the surface of the spectacle lens.

7. The method of claim 6, said mask being imaged onto the surface of the spectacle lens at a reduced size.

8. The method of claim 7, said mask being made of metal.

9. The method of claim 3, said mask being mad of metal.

10. The method of claim 6, said mask being made of metal.

11. A method of producing a marking on glass and plastic spectacle lenses, the method comprising: the step of directly irradiating those regions of the surface of the lens which define the form of the marking with an excimer laser at an energy lying between 1 J/cm$^2$ and 5 J/cm$^2$ so as to permit the radiation of the excimer laser itself to effect a small removal of the material of the lens to define the marking.

12. The method of claim 11, wherein the lens is devoid of an anti-reflection coating and the material removed from the lens leaves a marking recognizable only as a breath mark.

13. The method of claim 11, wherein the lens includes an anti-reflection coating and the material removed leaves an interference condition making the marking easily recognizable in reflected light while the person wearing the spectacles notices nothing.

14. A method of producing a marking on glass and plastic spectacle lenses, the method comprising: the step of directly irradiating those regions of the surface of the lens which define the form of the marking with an excimer laser driven with a pulse having a wavelength of approximately 193 nm so as to permit the radiation of the excimer laser itself to vaporize a thin layer of approximately 0.1 μm from the surface of the lens to define the marking.

15. The method of claim 1, wherein the energy of the excimer laser is adjusted to remove only so thin a layer from the surface of the spectacle lens that the marking is recognizable as a breath marking.

16. The method of claim 15, wherein said layer removed from said surface has a thickness of approximately 0.1 μm.

17. The method of claim 3, wherein the energy of the excimer laser is adjusted to remove only so thin a layer from the surface of the spectacle lens that the marking is recognizable as a breath marking.

18. The method of claim 17, wherein said layer removed from said surface has a thickness of approximately 0.1 μm.

19. The method of claim 6, wherein the energy of the excimer laser is adjusted to remove only so thin a layer from the surface of the spectacle lens that the marking is recognizable as a breath marking.

20. The method of claim 19, wherein said layer removed from said surface has a thickness of approximately 0.1 μm.

* * * * *

UNITED STATES PATENT AND TRADEMARK OFFICE
CERTIFICATE OF CORRECTION

PATENT NO.  : 4,912,298
DATED       : March 27, 1990
INVENTOR(S) : Erwin Daniels and Hermann Schürle It is certified that error appears in the above-identified patent and that said Letters Patent is hereby corrected as shown below:

In column 1, line 42: delete "method" and substitute -- methods -- therefor.

In column 2, line 12: delete "o" and substitute -- or -- therefor.

In column 2, line 27: delete "o" and substitute -- of -- therefor.

In column 2, line 34: delete "f" and substitute -- of -- therefor.

In column 2, line 35: delete "lass" and substitute -- glass -- therefor.

In column 3, line 35: delete "surface 160" and substitute -- surface 16o -- therefor.

In column 3, line 38: delete "image" and substitute -- imaged -- therefor.

UNITED STATES PATENT AND TRADEMARK OFFICE
CERTIFICATE OF CORRECTION

PATENT NO. : 4,912,298
DATED : March 27, 1990
INVENTOR(S) : Erwin Daniels and Hermann Schürle It is certified that error appears in the above-identified patent and that said Letters Patent is hereby corrected as shown below:

In column 3, line 42: delete "n" and substitute -- in -- therefor.

In column 3, line 47: delete "f" and substitute -- of -- therefor.

In column 3, line 54: delete "FIGS. 42" and substitute -- figures 42 -- therefor.

In column 4, line 20: delete "mad" and substitute -- made -- therefor.

Signed and Sealed this

Second Day of July, 1991

Attest:

HARRY F. MANBECK, JR.

*Attesting Officer*  *Commissioner of Patents and Trademarks*